United States Patent Office 3,038,575
Patented June 12, 1962

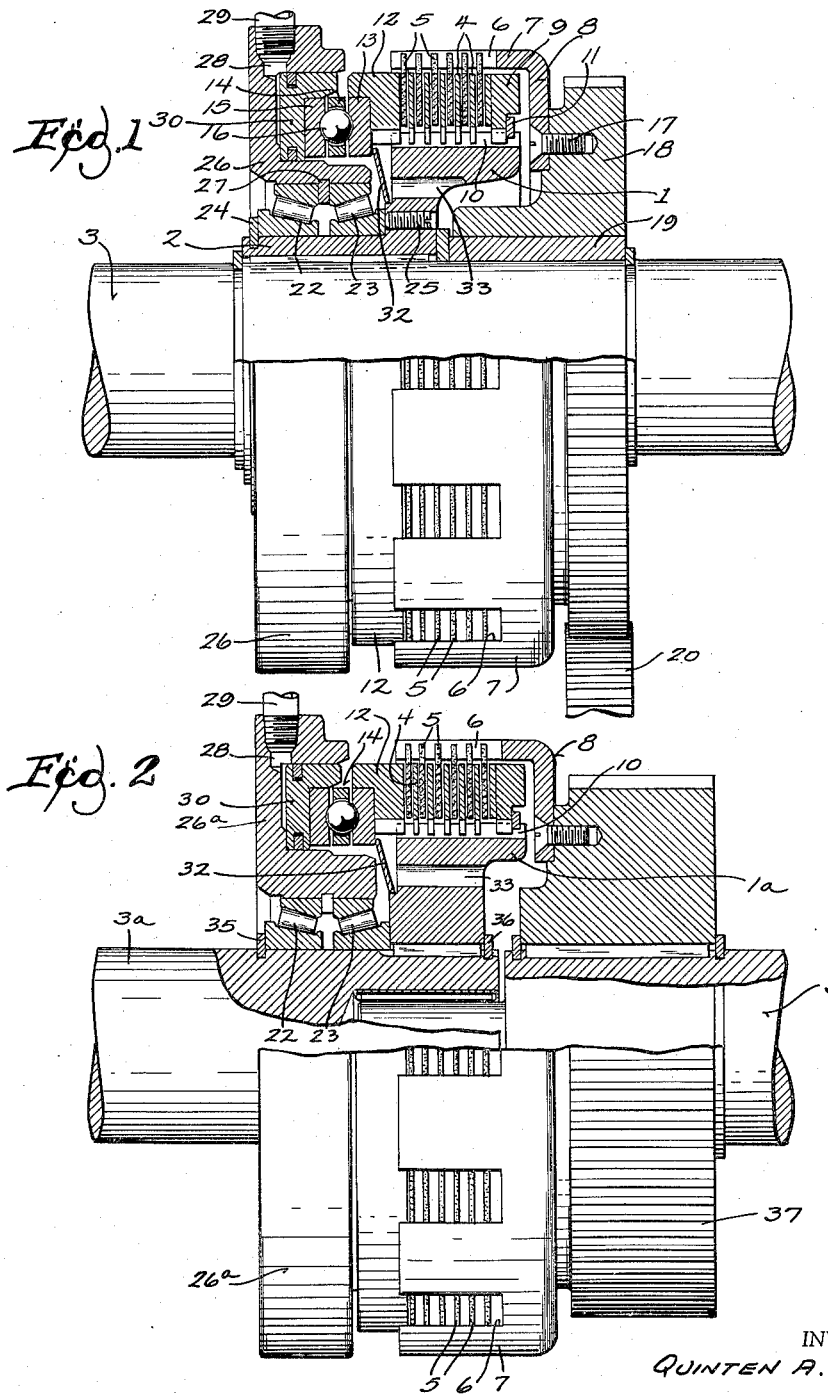

3,038,575
FLUID PRESSURE OPERATED CLUTCH WITH STATIONARY CYLINDER ASSEMBLY
Quinten A. Hansen, Highway 38, Franksville, Wis.
Filed Feb. 9, 1959, Ser. No. 791,990
1 Claim. (Cl. 192—85)

This invention relates generally to fluid pressure operated clutches and more particularly to that type having a non-rotatable cylinder and piston unit for actuating the clutch located between the drive and driven elements.

Certain prior art fluid-operated clutches have utilized an integral, concentric cylinder and piston assembly which rotates together with the clutch itself. Where the piston and cylinder assembly are thus an integral part of the clutch assembly, all of the forces are self-contained within the clutch assembly. No axial forces are imposed on the shaft or other machine members, and there are no limitations as to mounting the clutch with respect to the stationary machine members or housing. However, these devices have serious shortcomings because of the necessity of introducing fluid to rotating parts which requires, inter alia, rotating collectors or seals and rifle-drilling of the shafts. More specifically, seal velocity requirements are such that it is usually necessary to introduce and extract fluid at the internal diameter of the cylinder. In this situation, centrifugal force makes it difficult to extract the fluid and requires heavy release spring forces to expel the fluid, thereby reducing effective operating pressure.

In an attempt to overcome the above undesirable characteristics, other prior art devices utilize a stationary cylinder and piston for operating the clutch members, which cylinder is mounted on an adjacent machine or transmission case and the piston then applies thrust to the rotating clutch through an anti-friction bearing on which the piston is mounted. Therefore, these stationary cylinder devices do not have this centrifugal force problem in regard to the extraction of fluid and furthermore do not require expensive collectors or rotating fluid seals. As a result, the clutch can be mounted without regard to the above-mentioned fluid entry and exit problems. However, these latter prior art devices also have serious drawbacks, principally because of their lack of flexibility as to where they can be located in the transmission. As a result, these devices are not only large and complex, but also difficult and expensive to manufacture, particularly in machining the cylinder in the transmission housing, for example.

Accordingly, it is the object of the present invention to provide an improved fluid pressure operated clutch which eliminates the undesirable characteristics of the above prior art devices while at the same time retaining the advantages of each.

The present invention provides an improved pressure fluid operated clutch in which the clutch-operating cylinder and piston assembly are an integral part of the clutch assembly having all forces containable therein, and in which the said cylinder and piston assembly is non-rotatable thereby permitting simple fluid connections therewith.

These and other objects and advantages will appear hereinafter as this disclosure progresses, reference being had to the accompanying drawings, in which:

FIGURE 1 is an elevational view, partially in section, of a clutch made in accordance with the present invention; and FIGURE 2 is a view similar to FIGURE 1 but showing a modified form of the invention, certain parts being broken away for clarity.

For purposes of illustration, the invention has been shown as used with a multiple disc friction type clutch but other types of clutches, such as for example, friction cone or positive jaw types may also be used. Furthermore, the design shown is intended for wet operation in a transmission where space is at a premium and bearings need not be sealed or prelubricated, but it should be understood that the invention is also applicable to a dry operation design using suitable bearings.

During the following detailed description of the drawings and for the purpose of illustrating preferred forms of the invention, reference will be made to various parts as being a "drive" element or as being "driven," such as for example, a "drive shaft" or a "driven shaft." It should be understood, however, that it is not intended to thereby limit the invention to the exact form illustrated, and that the function of these parts may be reversed by reversing the direction in which power is being transmitted through the clutch assembly. Thereby the drive shaft in one situation may actually become the driven shaft in other installations.

Referring in greater detail to FIGURE 1 of the drawings the clutch spider 1 is splined by its drive hub 2 to the drive shaft 3 for driving rotation therewith. This spider has a series of separating discs 4 axially slidable thereon for driving rotation therewith. Between each of these separating discs is located a friction disc 5 which are held in the openings 6 in the flange 7 of the driven cup 8. A back-up plate 9 is also axially slidable on the splined portion 10 of the spider within the limit defined by the snap ring 11 on the other side of the interengaging discs. Also slidable on the splined portion of the spider is the pressure plate 12 which is notched to receive the output race 13 of the axial thrust bearing assembly 14. This anti-friction bearing assembly also includes the input race 15 and the balls 16.

The driven cup 8 is secured by cap bolts 17 to a gear 18 rotatably mounted on the shaft 3 by means of sleeve bushing 19. This gear 18 meshes with gear 20 to thereby drive the latter. It will be noted that the gear 18 is relatively narrow but is prevented from tipping on the shaft 3 because of its long hub portion. This length of hub is possible because of the shape of the spider which permits the gear hub to extend axially within the overhanging part of the spider. Stated otherwise, since the hub length of contact on the shaft is less than the overall axial length of the clutch through the disc pack, maximum hub length on the gear 18, or other driven member attached to the cup, is possible. This construction contributes to a particularly compact clutch without any sacrifice of strength thereof.

Mounted on the long hub of the spider are a pair of complementary tapered roller bearing assemlies 22 and 23 held captive by the snap ring 24 on the end of the hub. These dual bearing assemblies provide a rigid mounting for a cylinder 26 and it should be noted that this cylinder is thereby completely independent of any additional support means. A snap ring 27 is carried on the internal diameter of the cylinder and is located between the outer races of the assemblies 22 and 23. Thereby these assemblies stationarily support the cylinder on the rotatable shaft and also axially fix the cylinder against any thrust. Adjustment screws 25 extend through the spider for adjusting these bearings, and suitable snap rings are provided on the shaft to axially fix the clutch assembly.

The only other mounting requirement for the cylinder is that provision should be made to prevent rotation of the cylinder due to friction drag of the bearings. A conduit hose 29 is attached to the cylinder inlet 28 and is sufficient to serve this restraining purpose by acting as an anchor in preventing rotation. This restraining means, however, should provide no radial or axial support for the cylinder, which support would interfere with the normal operation of the bearings.

A piston 30 which is mounted within the cylinder is guided entirely by its fit in the cylinder and does not depend on the thrust bearing 14 for any radial alignment. This is because the spline fit on the pressure plate 12 allows the output race 13 to align itself correctly with the input race 15, the position of the latter of which is determined by the piston alignment in the cylinder. It will be noted that races 13 and 15 are accurately and securely held in their pressure plate and piston, respectively.

A Belleville spring 32 is located between the spider and race 13 and serves several functions, namely, to retract the piston on clutch disengagement, provide a continual light thrust on the thrust bearing to prevent separation of bearing members, and it acts as a dust shield to prevent wear particles from the friction discs from entering the bearings. Cored holes 33 throuh the spider permit such foreign matter to exit through the hub rather than accumulate behind the Belleville spring.

A modified form of the invention has been illustrated in FIGURE 2 and parts similar to the FIGURE 1 device have been similarly numbered. This modification shows an arrangement wherein the cylinder 26a is rotatably mounted by its bearing directly on the drive shaft 3a. In this modification, the drive member also includes the drive spider 1a which does not have the long drive hub of the FIGURE 1 spider, and is also of thicker cross-section. Snap rings 35 and 36 hold the inner races of the bearings and the spider together for rotation as a unit with shaft 3a. A driven shaft 3b is piloted in the drive shaft for independent rotation and has an axially fixed gear 37 splined thereto.

The driven element may take various forms, such as the cup and gear arrangement shown in FIGURE 1, on the through shaft 3 or the split shaft modification of FIGURE 2. Furthermore, the driven cup or other clutch member may be fastened directly to other members to be driven.

As indicated previously, power may be transmitted in the FIGURE 1 device from the gear 18 to the shaft 3, and in the FIGURE 2 device from the shaft 3b to the shaft 3a.

In operation, fluid pressure is introduced into the cylinder via hose 29 to shift the piston and thereby engage the clutch elements 4 and 5. The cylinder and piston are supported entirely on the bearings 22, 23 which have been shown as of the tapered roller type capable of absorbing radial and axial thrusts. The conduit 29 also acts to prevent the cylinder from rotating due to friction drag in the bearings.

The entire unit is compact and can be located anywhere in the transmission or other mechanism without regard to housings, machine frames or supports or other structure. A highly flexible unit has been provided, the only connection to which is the fluid hose. All of the forces and thrust loads are contained within the clutch assembly and all problems in respect to introducing fluid to a rotating member have been eliminated.

Economy of manufacture is obtained because of the ability to use identical units in various parts of a transmission.

Various modes of carrying out the invention are contemplated as being within the scope of the following claim particularly pointing out and distinctly claiming the subject matter which is regarded as the invention.

I claim:

An integral and self-contained fluid pressure operated clutch comprising, a first rotatable member including a shaft having a spider fixed thereon for rotation therewith, said spider having a relatively long hub portion which is secured to said shaft for rotation therewith, said spider also having an overhanging portion which extends from said hub portion and is radially spaced from said shaft, a second rotatable member coaxially arranged with said first member, said second rotatable member having a hub portion which extends axially within said overhanging part, interengaging clutch discs carried by said spider and second member; a non-rotatable cylinder and piston assembly including a cylinder which defines a pressure chamber, a piston reciprocable within said chamber for actuating said discs, and an axial antifriction thrust bearing between said piston and said discs; and antifriction radial and axial thrust-absorbing bearing means mounted between said assembly and said hub, said bearing means being located within and axially coextensive in length with the axial length of said cylinder, whereby said assembly is stacked radially of said bearing means and supported solely thereby.

References Cited in the file of this patent

UNITED STATES PATENTS

| | | |
|---|---|---|
| 794,899 | Sturdevant | July 18, 1905 |
| 1,864,126 | Ferris | June 21, 1932 |
| 2,587,230 | Schaad | Feb. 26, 1952 |

FOREIGN PATENTS

| | | |
|---|---|---|
| 737,399 | Germany | July 12, 1943 |
| 958,379 | France | Sept. 12, 1949 |